Patented Sept. 18, 1945

2,385,303

UNITED STATES PATENT OFFICE 2,385,303

ALKYLATION OF AROMATIC COMPOUNDS

Louis Schmerling, Chicago, Ill., assignor to Universal Oil Products Company, Chicago, Ill., a corporation of Delaware No Drawing. Application June 25, 1941, Serial No. 399,688

12 Claims. (Cl. 260—671)

This invention relates to the treatment of aromatic compounds to produce higher molecular weight alkyl derivatives thereof. More specifically the process is concerned with a method for alkylating aromatic hydrocarbons by olefinic hydrocarbons in the presence of a particular type of catalyst to produce mono-alkylated and poly-alkylated aromatic hydrocarbons.

In one specific embodiment the present invention comprises a process for producing alkylated aromatic hydrocarbons which comprises subjecting an aromatic hydrocarbon and an olefinic hydrocarbon to contact under alkylating conditions in the presence of a solution comprising essentially aluminum chloride dissolved in a nitroparaffin.

Aromatic hydrocarbons, such as benzene, toluene, other alkylated benzenes, naphthalene, alkylated naphthalenes, other poly-nuclear aromatics, etc., which are alkylated by olefinic hydrocarbons as hereinafter set forth, may be obtained by the distillation of coal, by the dehydrogenation of naphthenic hydrocarbons, by the dehydrogenation and cyclization of aliphatic hydrocarbons, alkylated aromatic hydrocarbons, and alkylated naphthenic hydrocarbons, and by other means.

Olefinic hydrocarbons utilizable for alkylating aromatic hydrocarbons are either normally gaseous or normally liquid and comprise ethylene, propene, butenes, and higher normally liquid homologs, the latter including various polymers of normally gaseous olefinic hydrocarbons. Di-olefins, cyclic olefins, and other poly-olefins may also be made to react with aromatic hydrocarbons, but generally under different conditions of operation from those employed in the alkylation of aromatic hydrocarbons with non-cyclic and branched-chain olefins. Aliphatic olefinic hydrocarbons utilizable in the present process are obtained from any source and comprise products of catalytic and thermal cracking of oils, those obtained by dehydrogenating the corresponding paraffinic hydrocarbons, by dehydrating alcohols, or by polymerization of normally liquid olefinic hydrocarbons. Olefin-producing substances such as alcohols, ethers, esters, alkyl halides, etc., are also utilizable in the presence of solutions of aluminum chloride in nitroparaffins to produce higher alkyl derivatives of aromatic compounds, particularly of aromatic hydrocarbons, although these different alkylating substances are not necessarily employed under the same conditions of operation as are utilized with olefinic alkylating agents.

Suitable catalysts for use in the process of the present invention comprise solutions of an aluminum halide as aluminum chloride, aluminum bromide, or mixtures thereof, in a nitroparaffin such as nitro-methane, nitro-ethane, a nitropropane, or a nitroparaffin of higher molecular weight. The different nitroparaffins which may thus be used for forming solutions containing aluminum halides utilized as catalysts in the present process are not necessarily equivalent in that some nitroparaffins are more suitable than others for producing aluminum halide solutions and particularly aluminum chloride solutions of high catalytic activity.

At about 20° C. the lower members of the nitroparaffin series, including nitromethane, nitroethane, and the nitropropanes dissolve as much as an equal weight of aluminum chloride and produce a homogeneous liquid which may be readily contacted with hydrocarbons being subjected to alkylation. A nitroparaffin which has a relatively high dissolving power for aluminum chloride forms with aluminum chloride a solution which is frequently miscible with the aromatic hydrocarbon as in the case of benzene, and the nitroparaffin may thus be said to serve as a solutizer for dispersing aluminum chloride in the aromatic hydrocarbon subjected to alkylation. Thus, if one part by weight of aluminum chloride is dissolved in its own weight of nitromethane and the solution is added to benzene, a clear yellow solution results with either 1 or 100 parts by weight of benzene and accordingly a homogeneous catalytic reaction may be so carried out in the presence of aluminum chloride. Aluminum chloride so dissolved or dispersed in a nitroparaffin and an aromatic hydrocarbon is in intimate contact with the alkylation reaction mixture so that 1 molecular proportion of aluminum chloride can easily catalyze the alkylation of as much as about 250 molecular proportions of aromatic hydrocarbon.

Essentially the same solutizing effect is observed when any other order of mixing is used for the aromatic hydrocarbon, aluminum chloride, and nitroparaffin. Thus, while only about 0.2 part by weight of aluminum chloride dissolves in 100 parts by weight of pure benzene, the presence of 0.6 part by weight of nitromethane in the benzene increased this solubility to about 3 parts by weight of aluminum chloride in 100 parts by weight of benzene. When 3 parts by weight of aluminum chloride were shaken with 40 parts by weight of benzene, there was no visible evidence of solution formation but after addition of 0.25 part by weight of nitromethane, the benzene layer became yellow.

A further addition of 0.35 part by weight of nitromethane caused from 30 to 50% of the aluminum chloride to dissolve while after another addition of 1.1 parts by weight of nitromethane, all of the initially introduced aluminum chloride dissolved to give a pale yellow solution. Similarly, the addition of 1 part by weight of 2-nitropropane to a mixture of 3 parts by weight of aluminum chloride and 40 parts by weight of benzene caused the solution of about half of the aluminum chloride while further addition of 1 part by weight of 2-nitropropane caused all of the aluminum chloride to dissolve forming a clear solution of reddish orange color.

The particular nitroparaffin chosen as a solutizer for aluminum chloride is also dependent upon the nature and proportions of the hydrocarbons being reacted, the conditions of operation, and other factors.

When aluminum chloride in the form of a solid is used for catalyzing the alkylation of aromatic hydrocarbons by olefinic hydrocarbons, the formation of sludge-like material upon the surface of the aluminum chloride during use decreases its catalytic activity and ordinarily makes it necessary to withdraw the sludge-like material and add fresh aluminum chloride in order to proceed with the alkylation. When alkylating in the presence of aluminum chloride dissolved in a nitroparaffin, the catalyst is substantially in the form of a liquid mixture or solution which is contacted readily with the reacting aromatic hydrocarbons and olefins. Thus relatively high speeds of alkylation are obtained with a given quantity of aluminum chloride because substantially all of the aluminum chloride thus introduced into the reaction mixture is available for catalyzing the reaction, a condition entirely different from that obtained when using solid particles of aluminum chloride where only the aluminum chloride on the surface of the particles can be contacted with the reacting hydrocarbons.

The alkylation of an aromatic hydrocarbon by an olefinic hydrocarbon in accordance with the present invention is preferably carried out in the presence of a solution of aluminum chloride in a nitroparaffin at a temperature of from about −10° to about 100° C. and under a pressure of from substantially atmospheric to about 100 atmospheres. The exact temperature employed in a given alkylation depends upon the properties of the aromatic hydrocarbon undergoing treatment. Thus, alkylation of benzene is effected at a temperature above its melting point of about 5.5° C., while lower temperatures are also usable for similar alkylation treatment of toluene and of other aromatic hydrocarbons with relatively low freezing point. In the hydrocarbon mixture subjected to alkylation it is preferable to have present from about 1 to about 40 molecular proportions of aromatic hydrocarbon per 1 molecular proportion of olefinic hydrocarbon added as alkylating agent. In general a higher molecular proportion of aromatic hydrocarbon to olefinic hydrocarbon is employed when a normally liquid olefin is used for this purpose because of the fact that the higher molecular weight olefins, particularly those boiling higher than pentenes, generally undergo depolymerization prior to or simultaneously with alkylation. Thus 1 molecular proportion of di-isobutene reacts with 2 molecular proportions of benzene to produce 2 molecular proportions of butylbenzene. A relatively small quantity of hydrogen chloride may be added to the aromatic-olefinic hydrocarbon reaction mixture generally in the approximate amount of from about 0.05 to about 5% by weight of the total hydrocarbon mixture subjected to contact with the solution of aluminum chloride in a nitroparaffin. It is frequently also desirable to have hydrogen present generally in a quantity of not more than about 10 mole per cent of the total aromatic and aliphatic hydrocarbons charged.

In effecting reaction between aromatic hydrocarbons and an alkylating agent as an olefinic hydrocarbon according to the process of the present invention, the exact method of procedure varies with the nature and proportions of the reacting constituents. A simple procedure, utilizable in the case of an aromatic hydrocarbon which is normally liquid (or if solid is readily soluble or dispersable in a nitroparaffin or other substantially inert liquid) and a normally gaseous or liquid olefinic hydrocarbon consists in contacting the aromatic and olefinic hydrocarbons with a solution of aluminum chloride in a nitroparaffin using either batch or continuous operations. Thus in batch type treatment a solution of aluminum chloride in a nitroparaffin is charged to a reactor containing an aromatic hydrocarbon and the reaction mixture is then stirred or otherwise agitated while an olefinic hydrocarbon or a hydrocarbon fraction containing olefinic hydrocarbons is added thereto preferably together with relatively small amounts of hydrogen chloride to effect formation of alkylated aromatic hydrocarbons of higher molecular weight than the aromatic hydrocarbon charged to the process. Only as much of the aluminum chloride-nitroparaffin solution is added as is required for catalyzing the alkylation at a desired rate, and the alkylation thus may be catalyzed by the use of a relatively small quantity of aluminum chloride. After the reaction the product may be treated with a small amount of water sufficient to hydrolyze the aluminum chloride and the remaining mixture of alkylated aromatic hydrocarbon, unconverted aromatic hydrocarbon, and nitroparaffin is separated by fractional distillation. The unconverted aromatic hydrocarbon and recovered nitroparaffin are then recycled to further use in the process as described.

Continuous type of alkylation treatment is carried out by introducing the olefinic hydrocarbon to a flowing stream of catalyst solution and normally liquid aromatic hydrocarbon or normally solid aromatic hydrocarbon in a suitable substantially nonreactive liquid solvent. The mixture of hydrocarbons and catalyst contained therein and preferably hydrogen chloride is passed through a tortuous path in some type of baffled mixer or reactor containing a packing material to effect intimate contact of the catalyst solution with the reacting hydrocarbons. The conditions of temperature and pressure employed in such an alkylation treatment are within the indicated limits but the particular conditions employed in any particular alkylation vary with the molecular weights and reactivities of the aromatic and olefinic hydrocarbons being treated, the concentration and activity of the catalyst solution used, and other factors.

It is generally advantageous to dilute the olefinic hydrocarbon with a portion of the aromatic hydrocarbon and to introduce the olefin-containing mixture at a plurality of points throughout the reaction zone rather than to commingle all of the olefinic hydrocarbon with the aromatic hydrocarbon prior to their introduction to the catalytic alkylation zone. In this way a relatively high ratio of aromatic hydrocarbon to olefinic hydrocarbon is readily maintained, alkylation is thereby favored, and olefin polymerization is kept relatively low. The reaction mixture obtained from such a continuous treatment is then commingled with sufficient water to decompose the remaining aluminum chloride, the liquid product is then dried and distilled to separate unconverted aromatic hydrocarbon, alkylated aromatic hydrocarbons, and the nitroparaffin solvent. The unconverted aromatic hydrocarbons and the recovered nitroparaffin solvent are recycled to further use in the process.

The following examples are given to illustrate the character of results obtained by the use of the present process, although the data presented are from selected cases and are not introduced with the intention of unduly restricting the generally broad scope of the invention.

Example I 4 parts by weight of aluminum chloride dissolved in 5.7 parts by weight of nitromethane formed a pale yellow solution to which 55 parts by weight of benzene was added to form a light yellow solution. The last-named solution was placed in a reactor cooled to 0° C. and 12 parts by weight of propene was passed thereto over a period of 2.5 hours during which the reaction temperature, because of the exothermic heat of reaction, was allowed to increase to 40° C. under atmospheric pressure. The clear yellow product so obtained was washed with water, then with sufficient dilute sodium hydroxide solution to dissolve the precipitated aluminum hydroxide, finally dried and distilled to yield 20 parts by weight of mono-isopropyl benzene, 8 parts by weight of di-isopropyl benzene, and 2.5 parts by weight of higher boiling material.

Similarly 1 part by weight of aluminum chloride dissolved in 2.3 parts by weight of nitromethane catalyzed the alkylation of 80 parts by weight of benzene by 15 parts by weight of propene at 30° to 40° C. forming 26 parts by weight of mono-isopropyl benzene, 10 parts by weight of di-isopropyl benzene, and 5 parts by weight of higher boiling material. In this run, 1 molecular proportion of aluminum chloride was employed with 137 molecular proportions of benzene present in the alkylation mixture. The yield of alkylated benzenes was approximately 100% of the theoretical based upon the propene consumed since there were no polymers or other products formed.

Example II

Only small amounts of ethyl benzene were obtained when ethylene was reacted with benzene in the presence of an aluminum chloride-nitromethane solution under the same conditions as used in alkylating with propene in Example I. Good yields of ethylated benzene were obtained, however, at 40° to 65° C. under about 40 atmospheres pressure in the presence of hydrogen chloride and of aluminum chloride dissolved in nitromethane. Thus a solution of 8 parts by weight of aluminum chloride in 10 parts by weight of nitromethane and 80 parts by weight of benzene, and 3 parts by weight of hydrogen chloride were mixed in an autoclave to which ethylene was added to 40 atmospheres pressure. The reaction temperature was kept at about 25° C. for 1 hour after which the temperature was increased to 40 C. for 4 hours and finally to 65° C. for 3 hours more. The resulting reaction product yielded 12 parts by weight of mono-ethyl benzene and 6 parts by weight of more-highly alkylated material.

Example III

A solution containing 5 parts by weight of aluminum chloride dissolved in 5.7 parts by weight of nitro-ethane was mixed with 80 parts by weight of benzene and propene was bubbled into the solution first at 0° C. and later at temperatures up to 40° C. under atmospheric pressure until 24 parts by weight of propene had reacted during a period of three hours. The resulting products contained 31 parts by weight of mono-isopropyl benzene, 16 parts by weight of di-isopropyl benzene, and 7 parts by weight of higher boiling material.

Example IV 6 parts by weight of propene was added slowly at 25° C. under atmospheric pressure to a homogeneous reaction mixture formed by adding 40 parts by weight of benzene to a solution of 5 parts by weight of aluminum chloride in 7.5 parts by weight of 2-nitropropane. The reaction products yielded 9.5 parts by weight of isopropyl benzene, 4.5 parts by weight of di-isopropyl benzene, and 3 parts by weight of higher boiling material.

Example V

A clear yellow solution was formed by dissolving 10 parts by weight of anhydrous aluminum chloride in 15 parts by weight of 2-nitropropane. The addition of 80 parts by weight of benzene to the yellow solution formed a clear red solution without any perceptible evolution of heat. The addition of 0.5 part by weight of di-isobutene caused the red solution to again turn yellow. More di-isobutene was then added, with shaking, in portions of 5 to 10 parts by weight until a total of 32 parts by weight of di-isobutene had been added at atmospheric pressure during which time the reaction mixture was cooled with water to maintain a temperature not above 35° to 40° C. The resulting reaction mixture after washing and drying was found to contain 4.5 parts by weight of tertiary butyl benzene and 38 parts by weight of higher boiling material.

Example VI

When 30 parts by weight of naphthalene was added to 34 parts by weight of nitromethane, cooling occurred and only part of the hydrocarbon dissolved. Addition to this mixture of a solution containing 5 parts by weight of aluminum chloride in 17 parts by weight of nitromethane yielded a mixture of brownish violet solution and undissolved naphthalene which was placed in a reactor to which propene was added under atmospheric pressure at a rate of about 12 parts by weight per hour. The undissolved naphthalene began to go into solution as soon as the propene was added and all naphthalene was dissolved after a reaction time of about 4 minutes. The reaction mixture became warm due to the heat of reaction and therefore the reaction vessel was placed in a bath at 30° C. during the remainder of the 1.5 hour hour run during which 13.5 parts by weight of propene was absorbed.

The reaction product was in the form of an olive brown solution which was poured into ice, then washed with water and alkali. Because of the formation of an emulsion it was necessary to dissolve the hydrocarbon product in ether after which the red ether solution was dried, distilled, and separated into 7 parts by weight of unconverted naphthalene and 31 parts by weight of alkylated naphthalenes boiling between about 260° and about 320° C. and having a refractive index which decreased gradually with increasing boiling point from 1.5827 to 1.5660, leaving undistilled about 3 parts by weight of a higher boiling residue.

EXAMPLE VII

A mixture of 80 parts by weight of dibenzyl (0.44 molecular proportion), 20 parts by weight of propene (0.48 molecular proportion), and a solution containing 7 parts by weight of aluminum chloride dissolved in 13 parts by weight of nitromethane was heated for 2 hours at 40° C. in a glass-lined rotating autoclave. After the reaction 120 parts by weight of homogeneous dark solution was recovered from the autoclave. This recovery indicated that all of the propene had been consumed in the reaction. The aluminum chloride and part of the nitromethane were removed from the reaction product by washing with water and alkali and the hydrocarbon layer was dried and distilled to separate unconverted dibenzyl from propylated dibenzyls. Distillation of the 93 parts by weight (99 volumes) of the washed and dried hydrocarbon product separated it into the following fractions:

*Distillation of product from reaction of propene with dibenzyl*

| Fraction No. | Boiling range of fraction, °C. | Fraction, volumes | Refractive index, $n_D^{22}$ |
|---|---|---|---|
| 1 | 83–100 | 2 | |
| 2 | 265–281 | 10 | |
| 3 | 281–300 | 40 | |
| 4 | 300–311 | 13 | 1.5441 |
| 5 | 311–317 | 8 | 1.5407 |
| 6 | 317–325 | 9 | 1.5380 |
| 7 | 325–330 | 5 | 1.5309 |
| Residue | | | |

Fraction No. 1 appeared to be largely nitromethane. Fractions No. 2 and No. 3 consisted mainly of unconverted dibenzyl with a melting point of 51° C., together with about 8 volumes of liquid hydrocarbons boiling between 281° and 289° C. and having a refractive index of 1.5462. Fractions No. 4 to No. 7, inclusive, consisted of normally liquid propylated dibenzyls.

EXAMPLE VIII

A solution of 5 parts by weight of anhydrous aluminum chloride was dissolved in 5 parts by weight of 2-nitropropane, and then mixed with 80 parts by weight of benzene to form a clear red solution to which after cooling to 0° C., was added to 40 parts by weight of normal propyl chloride. The resulting solution was allowed to stand at about 20° C. for 18 hours during which a slow evolution of hydrogen chloride occurred. The mixture was then heated at 60° to 70° C. for 1 hour with very little evolution of hydrogen chloride, then poured upon ice, washed with water, dried, and distilled. Thus 2.6 parts by weight of isopropyl benzene and 4.3 parts by weight of higher boiling alkylated hydrocarbons were obtained.

The nature of the present invention and its commercial utility can be seen from the specification and examples given, although neither section is intended to limit its generally broad scope.

I claim as my invention:

1. A process for producing alkylated aromatics which comprises contacting an olefin under alkylating conditions with a relatively clear solution of an aromatic hydrocarbon having an aluminum halide dissolved therein with the aid of a small amount of a nitroparaffin solutizer.

2. The process as defined in claim 1 further characterized in that said halide comprises aluminum chloride.

3. The process as defined in claim 1 further characterized in that said halide comprises aluminum bromide.

4. The process as defined in claim 1 further characterized in that said solution is maintained at a temperature of from about −10° C. to about 100° C. during the contacting of the olefin therewith.

5. The process as defined in claim 1 further characterized in that said nitroparaffin solutizer comprises nitromethane.

6. The process as defined in claim 1 further characterized in that said olefin is contacted with said solution in the presence of a hydrogen halide.

7. A process for producing alkylated benzenes which comprises contacting an olefin under alkylating conditions with a relatively clear solution of benzene having an aluminum halide dissolved therein with the aid of a small amount of a nitroparaffin solutizer.

8. The process as defined in claim 7 further characterized in that said halide comprises aluminum chloride.

9. The process as defined in claim 7 further characterized in that said halide comprises aluminum bromide.

10. The process as defined in claim 7 further characterized in that said solution is maintained at a temperature of from about −10° C. to about 100° C. during the contacting of the olefin therewith.

11. The process as defined in claim 7 further characterized in that said nitroparaffin solutizer comprises nitromethane.

12. The process as defined in claim 7 further characterized in that said olefin is contacted with said solution in the presence of a hydrogen halide.

LOUIS SCHMERLING.